US012780654B2

(12) United States Patent
Farrokhpanah et al.

(10) Patent No.: US 12,780,654 B2
(45) Date of Patent: Nov. 3, 2026

(54) STEAM-HYDROCARBON REFORMING WITH LOW STEAM PRODUCTION

(71) Applicant: Air Products and Chemicals, Inc., Allentown, PA (US)

(72) Inventors: Sonia Farrokhpanah, Surbiton (GB); Kelly Ann Forester, Harleysville, PA (US); David Ross Graham, Harleysville, PA (US); Michelle Schoonover, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 851 days.

(21) Appl. No.: 18/109,924

(22) Filed: Feb. 15, 2023

(65) Prior Publication Data

US 2024/0270573 A1 Aug. 15, 2024

(51) Int. Cl.
*C01B 3/26* (2006.01)

(52) U.S. Cl.
CPC ........ *C01B 3/26* (2013.01); *C01B 2203/0227* (2013.01); *C01B 2203/0283* (2013.01); *C01B 2203/0475* (2013.01); *C01B 2203/0827* (2013.01); *C01B 2203/0833* (2013.01); *C01B 2203/1241* (2013.01); *C01B 2203/86* (2013.01)

(58) Field of Classification Search
CPC .............. C01B 3/26; C01B 2203/0227; C01B 2203/0233; C01B 2203/0283; C01B 2203/0833
See application file for complete search history.

(56) References Cited

U.S. PATENT DOCUMENTS

| | | | | |
|---|---|---|---|---|
| 3,479,298 | A | 11/1969 | Sze et al. | |
| 3,882,636 | A | 5/1975 | Horie et al. | |
| 3,988,425 | A | 10/1976 | Jockel et al. | |
| 4,105,591 | A | 8/1978 | Banks et al. | |
| 4,340,501 | A | 7/1982 | Davidson | |
| 7,988,948 | B2 | 8/2011 | Guvelioglu et al. | |
| 8,137,422 | B2 | 3/2012 | Licht et al. | |
| 9,517,933 | B2 | 12/2016 | Adamopoulos et al. | |
| 2009/0230359 | A1 * | 9/2009 | Guvelioglu | C01B 3/48 423/652 |
| 2021/0002141 | A1 * | 1/2021 | Feinstein | C01B 3/384 |

FOREIGN PATENT DOCUMENTS

| | | |
|---|---|---|
| CN | 113443604 | 9/2021 |
| FR | 3007510 | 12/2014 |
| GB | 969637 | 9/1964 |
| GB | 1150066 | 4/1969 |
| GB | 1155843 | 6/1969 |

OTHER PUBLICATIONS

B.M. Tindall, et al, "Alternative Technologies to Steam-Methane Reforming", Hydrocarbon Processing, Nov. 1995, pp. 75-81.
David F. Sanders, et al, "Energy-efficient polymeric gas separation membranes for a sustainable future: A review", Polymer, vol. 54, pp. 4729-4761, 2013.

* cited by examiner

*Primary Examiner* — Anthony J Zimmer
*Assistant Examiner* — Eric Scott Sherman
(74) *Attorney, Agent, or Firm* — Jason M. Ploeger

(57) ABSTRACT

Syngas may be produced in a reformer in a manner that minimizes the steam produced for export by utilizing heat from the syngas stream to produce and superheat steam upstream of the water gas shift reactor. The superheated steam may be combined with the reformer feed stream to improve overall thermal efficiency.

9 Claims, 5 Drawing Sheets

STEAM-HYDROCARBON REFORMING WITH LOW STEAM PRODUCTION

BACKGROUND

Existing industrial processes such as reforming hydrocarbon feeds to produce hydrogen and syngas will need to capture carbon dioxide (CO2) to mitigate the effects of climate change. Steam methane reforming (SMR) is the most common reforming technology, but uses air-fired combustion of a fuel gas to generate the heat needed to drive the reforming reactions. Air-fired combustion generates a flue gas in which any carbon in the fuel gas is converted to CO2 at low pressure and concentration due to the high amounts of inert nitrogen contributed by the air. Carbon capture from flue gas is costly, inefficient, and bulky. Eliminating carbon from the fuel gas in air-fired combustion enables efficient capture of nearly 100% of the CO2 in the process by capturing CO2 in the syngas which has CO2 at a much higher concentration and pressure.

Typical SMR processes generate excess heat that can be exported as steam to nearby customers, such as refineries. However, in the absence of a steam customer, heat generated by the SMR process must be used internally to maximize the overall thermal efficiency of hydrogen and syngas production.

BRIEF DESCRIPTION OF THE DRAWINGS

The present disclosure will hereinafter be described in conjunction with the appended figures wherein like numerals denote like elements.

DETAILED DESCRIPTION

Figure 1:
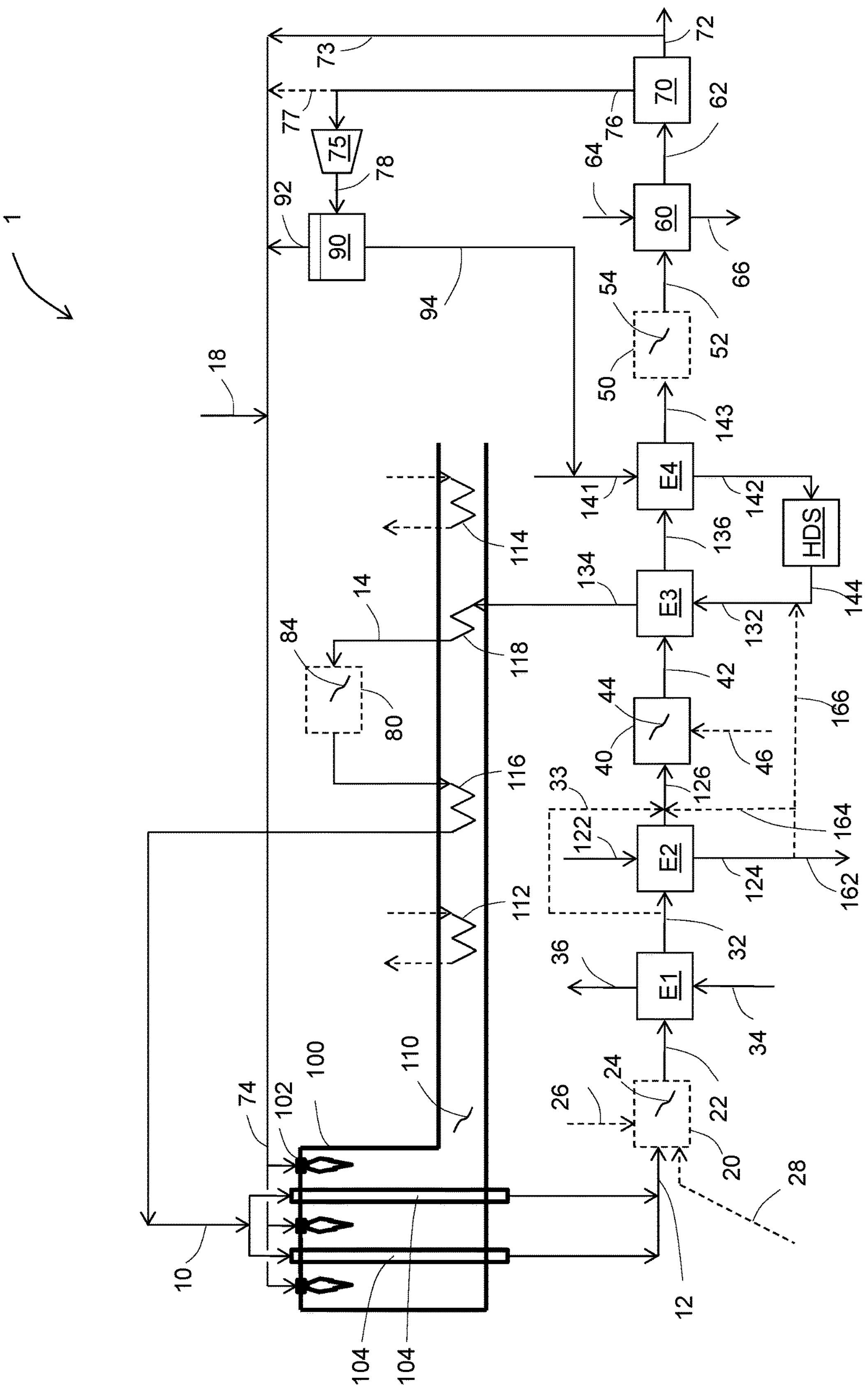
FIG. 1 is a diagram depicting an embodiment of a reforming process according to one or more aspects of the present disclosure in which heat from the syngas is used to boil water and superheat steam for use in the process.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The articles "a" or "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The phrase "at least a portion" means "a portion or all." The "at least a portion of a stream" has the same composition, with the same concentration of each of the species, as the stream from which it is derived.

The term "and/or" placed between a first entity and a second entity includes any of the meanings of (1) only the first entity, (2) only the second entity, or (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B but not C, (5) A and C but not B, (6) B and C but not A, and (7) A and B and C.

The adjective "any" means one, some, or all, indiscriminately of quantity.

The terms "depleted" or "lean" mean having a lesser mole percent concentration of the indicated component than the original stream from which it was formed. "Depleted" and "lean" do not mean that the stream is completely lacking the indicated component.

The terms "rich" or "enriched" mean having a greater mole percent concentration of the indicated component than the original stream from which it was formed.

"Downstream" and "upstream" refer to the intended flow direction of the process fluid transferred. If the intended flow direction of the process fluid is from the first device to the second device, the second device is downstream of the first device. In case of a recycle stream, downstream and upstream refer to the first pass of the process fluid.

The term "indirect heat exchange" refers to the process of transferring sensible heat and/or latent heat between two or more fluids without the fluids in question coming into physical contact with one another. The heat may be transferred through the wall of a heat exchanger or with the use of an intermediate heat transfer fluid. The term "hot stream" refers to any stream that exits the heat exchanger at a lower temperature than it entered. Conversely, a "cold stream" is one that exits the heat exchanger at a higher temperature than it entered.

FIG. 1 shows an embodiment of a reforming process 1 that produces hydrogen from a hydrocarbon feedstock and captures carbon dioxide. The hydrocarbon feedstock comprises at least one hydrocarbon species with one or more carbon atoms, and may be straight-chain, branched, cyclic, or aromatic. The hydrocarbon feedstock may comprise both saturated and unsaturated hydrocarbon species. The hydrocarbon feedstock may be derived from natural gas, liquefied petroleum gas, refinery off gas, naphtha, and/or other feedstocks known in the art.

A reformer feed stream 10 comprising steam and the hydrocarbon feedstock enters a plurality of catalyst-containing reformer tubes 104 in a reformer furnace 100. In the plurality of catalyst-containing reformer tubes 104 the hydrocarbon feedstock reacts with the steam at a temperature ranging from 700° C. to 1000° C. and a pressure ranging from 2 to 50 atmospheres to form a first syngas stream 12 comprising hydrogen, carbon monoxide, and carbon dioxide.

Reformer furnaces with a plurality of catalyst-containing reformer tubes, i.e. tubular reformers, are well known in the art. Suitable materials and methods of construction are known. Catalyst in the catalyst-containing reformer tubes 104 may be any suitable catalyst or combination of catalysts known in the art, for example, a supported catalyst comprising nickel.

A flue gas 110 exits the reformer furnace 100 and may provide heating duties required by the SMR process to improve the overall thermal efficiency, such as a shock boiler 112 and a boiler feed water preheater 114. Other heating duties may include preheating the air used in the one or more burners in the reformer furnace. Because the flue gas 110 has had carbon dioxide removed it has a much lower heat capacity than a typical SMR process. For this reason heating duties such as superheating steam, which would typically be done against the flue gas 110, is instead done against the third syngas stream 32. The flue gas 110 is then freed to provide more heat to the air used in the one or more burners 102 which in turn lowers the fuel required by the one or more burners 102 to provide the same heat input to the reformer tubes 104.

In at least some embodiments, the reformer feed stream 10 may be produced by an optional prereformer 80, defined as any unfired vessel that converts the hydrocarbon feedstock by reaction with steam over a catalyst with or without heating. The prereformer 80 may be an fixed bed reactor or a tubular reactor. The prereformer may, in at least some aspects, employ a different type of catalyst than the catalyst-containing reformer tubes 104, for example a high activity, high nickel content catalyst. In the embodiment shown in FIG. 1, a prereformer feed stream 14 comprising steam and a hydrocarbon feedstock enters the prereformer 80. In the presence of a prereforming catalyst 84, the hydrocarbon feedstock reacts with the steam at a temperature ranging from 400° ° C. to 600° C. and a pressure ranging from 2 to 50 atmospheres to form the reformer feed stream 10. The hydrocarbon feedstock in prereformer feed stream 14 and reformer feed stream 10 may comprise one or more compositions which may vary due to reforming reactions in the prereformer. For example, propane and butane in the prereformer feed stream 14 may react to form methane in the reformer feed stream 10. In at least some embodiments, the reformer feed stream may be heated after the prereformer 80 in a feed reheat exchanger 116 against the flue gas 110.

Prereforming catalyst 84 may comprise at least one metal selected from a group consisting of nickel, cobalt, platinum, palladium, rhodium, ruthenium, iridium and mixtures thereof. Reforming catalysts suitable for prereforming, such as those discussed in U.S. Pat. Nos. 4,105,591, 3,882,636, 3,988,425, GB 969,637, GB 1, 150,066, and GB 1, 155,843, may be used in at least some aspects.

Prereforming catalyst 84 may be present in a wide variety of shapes or forms, for example cylindrical pellets, Raschig rings, multi-hole shaped catalyst, etc. or other form known in the art. In at least some example implementations, the catalyst size may range from about 1 mm to about 15 mm in diameter and the length of the catalyst may range from about 3 mm to 10 mm. The preferred size for a given application depends on a number of factors including the catalyst shape and nickel loading, the operating temperature, pressure, and feed composition, and the allowable pressure drop. A catalyst with a multi-hole shape with a diameter in the range from 5 mm to 25 mm and a height to diameter ratio of 0.5 to 1.2 is also suitable for prereforming catalyst 84. One skilled in the art is able to select suitable catalyst with a suitable shape for prereforming catalyst 84.

In at least some example implementations, rereforming catalyst 84 may also be structured packing catalyst where the catalyst is applied as a washcoat on a structured packing. Structured packing is known in the art. As used herein, the term "structured packing" means a flow guide having a plurality of substantially parallel passages. Substantially parallel means parallel within manufacturing tolerances. Davidson, U.S. Pat. No. 4,340,501 describes a structure in a reactor vessel where the fluid is intermittently but controllably brought into contact with the vessel walls that would be suitable for a structured packing prereforming catalyst.

In at least some embodiments, the first syngas stream 12 may be further combined with a secondary feed stream 28 and reformed in an optional secondary reforming reactor 20. The secondary reforming reactor 20 may also combine an oxygen-rich gas 26 with the first syngas stream 12 to partially oxidize the first syngas stream 12 and react it in the presence of a secondary reforming catalyst 24 to further convert unreacted hydrocarbon species to produce carbon monoxide and hydrogen and form a second syngas stream 22. In at least some embodiments, the oxygen-rich gas 26 may be combined with the first syngas stream 12 before the secondary reforming reactor 20 or may be combined with the first syngas stream 12 in the secondary reforming reactor 20, for example through a burner.

The secondary feed stream 28 may be introduced into the first syngas stream 12 before the resultant mixture is introduced into the secondary reforming reactor 20. The feed gas 28 may be introduced into the first syngas stream 12 in the secondary reforming reactor 20. In most embodiments, the oxygen-rich gas will be introduced into the secondary reforming reactor 20 separately from the secondary feed stream 28 and the first syngas stream 12. The hydrocarbon source for the secondary feed stream 28 may be the same as the hydrocarbon source for the reformer feed stream 10 and/or the prereformer feed stream 14.

Providing a feed gas comprising at least one hydrocarbon and reacting the feed gas in the secondary reforming reactor 20 allows additional hydrocarbon feedstock be reformed without increasing the size of the reformer furnace 100 and correspondingly, the plurality of catalyst-containing reformer tubes. One skilled in the art can suitably optimize the size of and amount of feedstock processed in the reformer furnace 100 and the secondary reforming reactor 20. Another benefit provided by the secondary reforming reactor 20 is that fuel requirements in the reformer furnace 100 are reduced.

Secondary reforming reactors are well-known in the art and used widely for the production of ammonia and methanol. Secondary reforming reactors are refractory lined vessels with one or more burners and a reforming catalyst bed. Heat required for the reforming reaction may be provided by partial oxidation (combustion) of a portion of the feed. Effluent from the primary reformer may be fed to the secondary reforming reactor where it is mixed with oxygen fed through a burner. Partial oxidation reactions occur in a reaction zone adjacent or just below the burner. The partially oxidized mixture then passes through a catalyst bed where the mixture is substantially thermodynamically equilibrated over the reforming catalyst. U.S. Pat. No. 3,479,298, incorporated herein by reference, discloses a secondary reformer for the production of a hydrogen-containing gas, and discloses that if oxygen is used instead of air, the process gas leaving the secondary reformer is a gas suitable for further treatment to yield methanol or high purity hydrogen. Tindall et al., "Alternative technologies to steam-methane reforming," Hydrocarbon Processing, pp. 75-82, November, 1995, also disclose a oxygen secondary reformer for producing hydrogen.

In at least some embodiments of the present disclosure, the second syngas stream 22 is cooled in a first heat exchanger system E1 which comprises a boiler to produce a first saturated steam stream 36 from a water-containing stream 34 by indirect heat exchange with the second syngas stream 22. A third syngas stream 32 is produced by the first heat exchanger system E1. The first saturated steam stream 36 may enter a saturated steam header (not shown). The first heat exchanger system E1 may also utilize the heat from the second syngas stream 22 to provide heating duties required by the SMR process to improve the overall thermal efficiency, such as preheating the reformer feed stream 10. In at least some embodiments, the temperature of the third syngas stream 32 ranges from 750 F to 1050 F, or from 800 F to 1050 F, or from 850 F to 1050 F. The temperature of the third syngas stream 32 in a typical process would be less than 700 F to provide a sufficient safety margin against failure mechanisms such as metal dusting.

In at least some embodiments of the present disclosure, the third syngas stream 32 is cooled in a second heat exchanger system E2 which comprises a steam superheater to heat a saturated steam stream 122 and produce a superheated steam stream 124. A fourth syngas stream 126 is produced by the second heat exchanger system E2. The saturated steam 122 may be supplied directly from the outlet of the first heat exchanger system E1 and/or the saturated steam header. The superheated steam stream 124 may be divided to form a first superheated steam fraction 162 and enter a superheated steam header. In at least some embodiments, a portion of the third syngas stream 32 may be divided to form steam superheater bypass stream 33 which is then combined with the fourth syngas stream 126. Changing the fraction of the third syngas stream 32 that bypasses the second heat exchanger system E2 can be used to control the temperature of the fourth syngas stream 126.

A first water gas shift reactor 40 may be used to react carbon monoxide in the fourth syngas stream 126 with water in the presence of a shift catalyst 44 to produce a first shifted syngas stream 42 comprising more hydrogen. The fourth syngas stream 126 enters at a first temperature and, in an example embodiment where the first water gas shift reactor 40 is an adiabatic reactor, the fourth syngas stream 126 increases in temperature due to the exothermic shift reaction. In the case where the first water gas shift reactor 40 is cooled, the fourth syngas stream 126 may remain constant in temperature or be cooled overall. To enhance the water gas shift (WGS) reaction, at least a portion of the superheated steam stream 124 may be divided to form a second superheated steam fraction 164 which is then combined with the fourth syngas stream 126. The second superheated steam fraction 164 may be combined with the fourth syngas stream 126 upstream of the first water gas shift reactor 40 or inside the first water gas shift reactor 40. The additional steam acts to shift the equilibrium to produce more hydrogen and carbon dioxide. A first additional steam 46 can optionally be introduced to the reactor as well. The WGS catalyst may be an iron-based high temperature WGS catalyst, or a copper-based medium temperature WGS catalyst, a copper-based low temperature WGS catalyst, or any other suitable WGS catalyst, as may be selected by a person skilled in the art. The first shift catalyst 44 may comprise iron oxide and the reaction temperature may be from 310° C. to 500° C. or 310° C. to 400° C. The first shift catalyst 44 may comprise copper and the reaction temperature may be from 200° C. to 400° C. or 200° C. to 350° C.

In at least some embodiments of the present disclosure, the first shifted syngas stream 42 is cooled in a third heat exchanger system E3 which comprises a mixed feed preheater to heat a first mixed feed stream 132 to produce a second mixed feed stream 134. A second shifted syngas stream 136 is produced in the third heat exchanger system E3. In at least some embodiments, the second mixed feed stream 134 may be heated against the flue gas 110 in heat exchanger 118.

In at least some embodiments of the present disclosure, the second shifted syngas stream 136 is cooled in a fourth heat exchanger system E4 which comprises a feed preheater to heat a first feed stream 141 to produce a second feed stream 142. A third shifted syngas stream 143 is produced in the third heat exchanger system E4. The second feed stream 142 may enter a desulfurization unit HDS to remove sulfur containing species by reaction with hydrogen to produce hydrogen sulfide which may be removed by means such as absorption or adsorption, producing a third feed stream 144. The third feed stream 144 may be combined with a source of steam to produce the first mixed feed stream 132. Sources of the steam may include any combination of the first saturated steam stream 36, the saturated steam header, the superheated steam stream 124, and the saturated steam header. In the embodiment shown in FIG. 1, a portion of the superheated steam stream 124 is divided to form a third superheated steam fraction 166 and combined with the third feed stream 144 to produce the first mixed feed stream 132.

In at least some example implementations, the third shifted syngas stream 143 may enter a second water gas shift reactor 50 with a second shift catalyst 54 at a second temperature to produce a further shifted syngas stream 52. A second additional steam (not shown) can optionally be introduced to the second water gas shift reactor 50. The second temperature may be lower than the first temperature to allow the shifted syngas stream 42 to react more carbon monoxide with water to produce hydrogen, as the equilibrium moves towards hydrogen at lower temperatures. The second shift catalyst 54 may comprise copper and/or zinc oxide and the reaction temperature may range from 190° C. to 300° C. The second temperature may also be at the same or a higher temperature than the first temperature, for example when the third syngas stream 32 increases in temperature in the first water gas shift reactor 40, then the first shifted syngas stream 42 may be cooled before entering the second water gas shift reactor 50.

Carbon dioxide is removed from the further shifted syngas stream 52 in a carbon dioxide removal system 60. The carbon dioxide removal system 60 may comprise a gas scrubber in which a wash stream 64 is contacted with the further shifted syngas stream 52 to produce a carbon dioxide-depleted syngas stream 62 and carbon dioxide-enriched wash stream 66. The wash stream 64 may be any scrubbing fluid known in the art, for example N-methyl diethanolamine (aMDEA), monoethanol amine (MEA), other amine-based systems, or other scrubbing fluids associated with other scrubbing methods, for example, Rectisol®, Selexol®, Genosorb®, and Sulfinol.

The carbon dioxide-depleted syngas stream 62 is fed to an inlet port of a product purification unit 70 to produce a hydrogen-enriched product stream 72 which exits via a product outlet port and a hydrogen-depleted tail gas stream 76 comprising hydrogen, methane, and carbon monoxide, which exits via a tail gas outlet port. This product purification unit may be a pressure swing absorption unit for a hydrogen production process. In at least some embodiments, at least a portion of the tail gas stream 76 may be compressed in tail gas compressor 75 to produce a compressed tail gas stream 78.

The compressed tail gas stream 78 enters an inlet port of a membrane separation system 90 which may comprise a single membrane stage or a plurality of membrane stages in series and/or parallel. The compressed tail gas stream 78 is separated by selective permeation into a hydrogen-enriched permeate stream 92 which exits via a permeate outlet port and a hydrogen-depleted retentate stream 94 which exits via a retentate outlet port. Hydrogen selectively permeates the membrane over slower species such as methane and carbon monoxide. Owing to the small size of the hydrogen molecule, it has a high diffusivity and therefore is expected to permeate faster than methane and carbon monoxide for most membrane materials.

Sanders et al (Polymer; vol 54; pp 4729-4761; 2013) provide a convenient summary of current membrane technology. They describe the physical parameters and performance characteristics of polymeric membranes including polystyrene, polysulfone, polyethersulfone, polyvinyl fluoride, polyvinylidene fluoride, polyether ether ketone, polycarbonate, polyphenylene oxide, polyethylene, polypropylene, cellulose acetate, polyimide (such as Matrimid 5218 or P-84), polyamide, polyvinyl alcohol, polyvinyl acetate, polyethylene oxide, polydimethylsiloxane, copolymers, block copolymers, or polymer blends. Existing industrially useful gas separations are performed primarily with polymers such as those listed above or rubbery materials such as silicone. Additional membrane materials may comprise mixed-matrix membranes, perfluoropolymers, thermally rearranged polymers, facilitated transport membranes, metal-organic frameworks, zeolitic-imidazolate frameworks, electrochemical membranes, metallic membranes, and carbon molecular sieves. The membrane material in the membrane separation system 90 can be any of those listed above, or any other material that has a faster permeation rate for some compounds such as hydrogen and a slower permeation rate for some compounds such as methane and carbon monoxide. In an example implementation in which the membrane material comprises a metal highly selective to hydrogen, such as palladium, the membrane separation system 90 would operate at a high temperature, such as between 280 and 440° C.

Suitable membrane materials may be manufactured as hollow fibers and packaged as membrane bundles, or may be manufactured as flat sheets, packaged as spiral-wound or plate-and-frame units, in order to provide a larger surface area to volume ratio, and housed in a module. Gas entering the module contacts the membrane, and a fraction of the gas permeates through the membrane and leaves the module in the lower-pressure permeate stream. The faster permeating gases will be enriched in the permeate relative to the slower permeating gases. The fraction of the gas that does not permeate through the membrane leaves the module in the non-permeate, or retentate, stream which is enriched in the slower permeating gases relative to the faster permeating gases.

In at least some example implementations, compressed tail gas stream 78 may be treated prior to being introduced into membrane separation system 90 if there are any compounds present that would impair the operation of the membrane—for example heavy hydrocarbons (hexanes and heavier alkanes) and/or aromatics like benzene, toluene and xylene (collectively known as BTX). Pretreatment may be performed by adsorption, absorption, or partial condensation. In at least some embodiments, pretreatment would be unnecessary as the reforming reactions in the upstream catalyst-containing reformer tubes 104 would be expected to consume any dangerous compounds.

At least a portion of the hydrogen-enriched permeate stream 92 is combusted as fuel gas 74 in one or more burners 102 supplying heat to the reformer furnace 100 to drive the endothermic reforming reactions in the catalyst-containing reformer tubes 104. The fuel gas 74 may also comprise a tail gas fuel fraction 77 formed by dividing a portion of the hydrogen-depleted tail gas stream 76. In at least some aspects, the tail gas fuel fraction 77 may also act as a purge stream to allow slow-permeating inert components rejected by the membrane separation system 90, such as nitrogen and/or argon, to exit the system. Slow-permeating inert components are not consumed in the reforming reactions, so the primary pathway to exit the process is through the one or more burners 102. In at least some aspects, the fuel gas 74 may comprise a hydrogen product fuel fraction 73 formed by dividing a portion of the hydrogen-enriched product stream 72 and/or a supplementary fuel 18.

In accordance with at least some embodiments of the disclosure, the flue gas 110 in the disclosed process and apparatus contains a reduced amount of carbon dioxide compared to existing processes in which the hydrogen-depleted tail gas stream 76 may be combusted in the reformer furnace 100. In at least some example implementations, decreasing the flow rate of the tail gas fuel fraction 77 would increase the overall carbon capture percentage as fewer carbon-containing species exit via the flue gas 110, however the load on the product purification unit 70 will increase as more inert gas is fed to it. This presents a tradeoff in which higher carbon capture percentages require higher loads on the product purification unit 70.

The hydrogen-depleted retentate stream 94 is recycled to the steam methane reforming process by combining with the reformer feed stream 10. In at least some embodiments, the hydrogen-depleted retentate stream 94 may first be heated by one or more hot streams such as the reacted syngas stream 22, the flue gas 110, and steam. In accordance with at least some embodiments of the disclosure, recycling the hydrogen-depleted retentate stream 94 allows additional carbon-containing compounds such as methane and carbon monoxide in the retentate stream 94 to be converted to carbon dioxide and captured by the carbon dioxide removal system 60, which may reduce the amount of carbon dioxide emitted from the reforming process. The amount of carbon dioxide emissions in the flue gas 110 may be adjusted by altering the amount of hydrogen product fuel fraction 73, the amount of tail gas fuel fraction 77 and the amount of supplementary fuel 18 that are used as fuel.

In at least some aspects where most of the carbon-containing compounds in tail gas 76 are separated in the membrane separation system 90 to the hydrogen-depleted retentate stream 94 and recycled to the reforming process and the fuel gas 74 consists primarily of the hydrogen product fuel fraction 73 and the hydrogen-enriched permeate stream 92, the carbon dioxide emissions in the flue gas 110 may be substantially reduced compared to existing processes. In at least some aspects, the tail gas fuel fraction 77 may be used as fuel gas 74 to reduce the buildup of inert gases (e.g. nitrogen and argon) in the process streams. In some embodiments of the disclosure, a portion of the tail gas 76 may be used in another process and/or disposed, for example, a portion of the compressed retenate may be sent for use as fuel for another process located in proximity to the hydrogen plant, for example a fired heater or boiler.

The hydrogen-depleted retentate stream 94 may be recycled to other locations, typically upstream of a reforming reactor such as the prereformer 80 or the secondary reformer 20.

In accordance with at least some embodiments of the disclosure, carbon dioxide capture may be enhanced by injecting more carbon dioxide into the process into any of the prereformer feed stream 14, the reformer feed stream 10, the first syngas stream 12, the secondary feed stream 28, and/or the hydrogen-depleted retentate stream 94. In some aspects, carbon dioxide may partially or completely replace steam in the reforming reaction. The carbon dioxide functions as a reactant with the hydrocarbon feedstock just as steam is a reactant with the hydrocarbon feedstock in steam reforming. Effectively, dry reforming can be thought of as stoichiometrically equivalent to the combination of a steam reforming reaction and a reverse WGS reaction as shown below.

$$CO2 + CH4 = 2\,H2 + 2\,CO \text{ (dry reforming)}$$

$$H2O + CH4 = 3\,H2 + CO \text{ (steam reforming)}$$

$$CO2 + H2 = CO + H2O \text{ (reverse WGS)}$$

Figure 2:
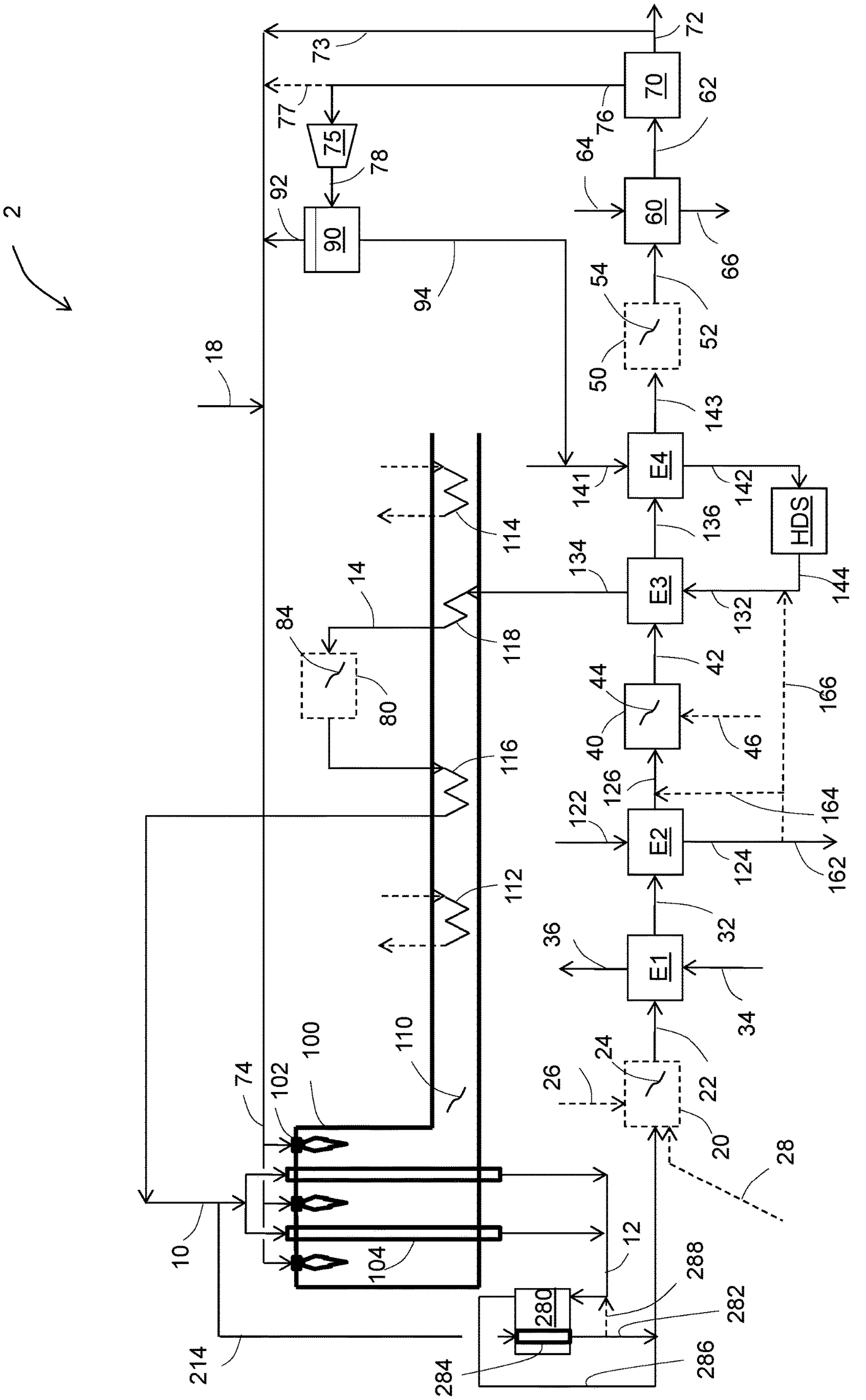
FIG. 2 is a diagram depicting a modification of FIG. 1 in which a recuperative reformer is integrated with the reforming process.

The flowsheet shown in FIG. 2 shows an embodiment of a reforming process 2 according to an additional example embodiment of the present disclosure, in which a portion of the reformer feed stream 10 is divided to form recuperative reformer feed stream 214 and fed to a recuperative reformer 280. A recuperative reformer is a heat exchanger that transfers heat to drive a catalytic reforming reaction. This allows more process heat to be used to drive more reforming reaction, of particular relevance for applications that require low or zero export steam. In at least some embodiments, steam (not shown) may be added to the recuperative reformer feed stream 214 upstream of the recuperative reformer 280. The recuperative reformer 280 may be implemented in a shell-and-tube arrangement. In the example embodiment shown in FIG. 2, the recuperative reformer feed stream 214 enters the tube side 284, which comprises a recuperative reforming catalyst, of the recuperative reformer 280. The first syngas stream 12 enters the shell side to provide heat to the recuperative reformer feed stream 214 which reacts in the presence of the recuperative reforming catalyst to form a recuperative reformer outlet stream 282. The recuperative reformer outlet stream 282 is combined with cooled syngas stream 286 and may optionally feed secondary reformer 20 as in reforming process 1. In at least some embodiments, at least a portion of the hydrogen-depleted retentate stream 94 may be combined with the recuperative reformer feed stream 614 (not shown).

In at least some embodiments, the recuperative reformer outlet stream 282 is diverted via line 288 and combined with the first syngas stream 12 prior to entering the hot side of the recuperative reformer 280. The plumbing of the recuperative reformer may be simplified by mixing the recuperative reformer outlet stream 282 and the first syngas stream 12 within the recuperative reformer 280.

Figure 3:
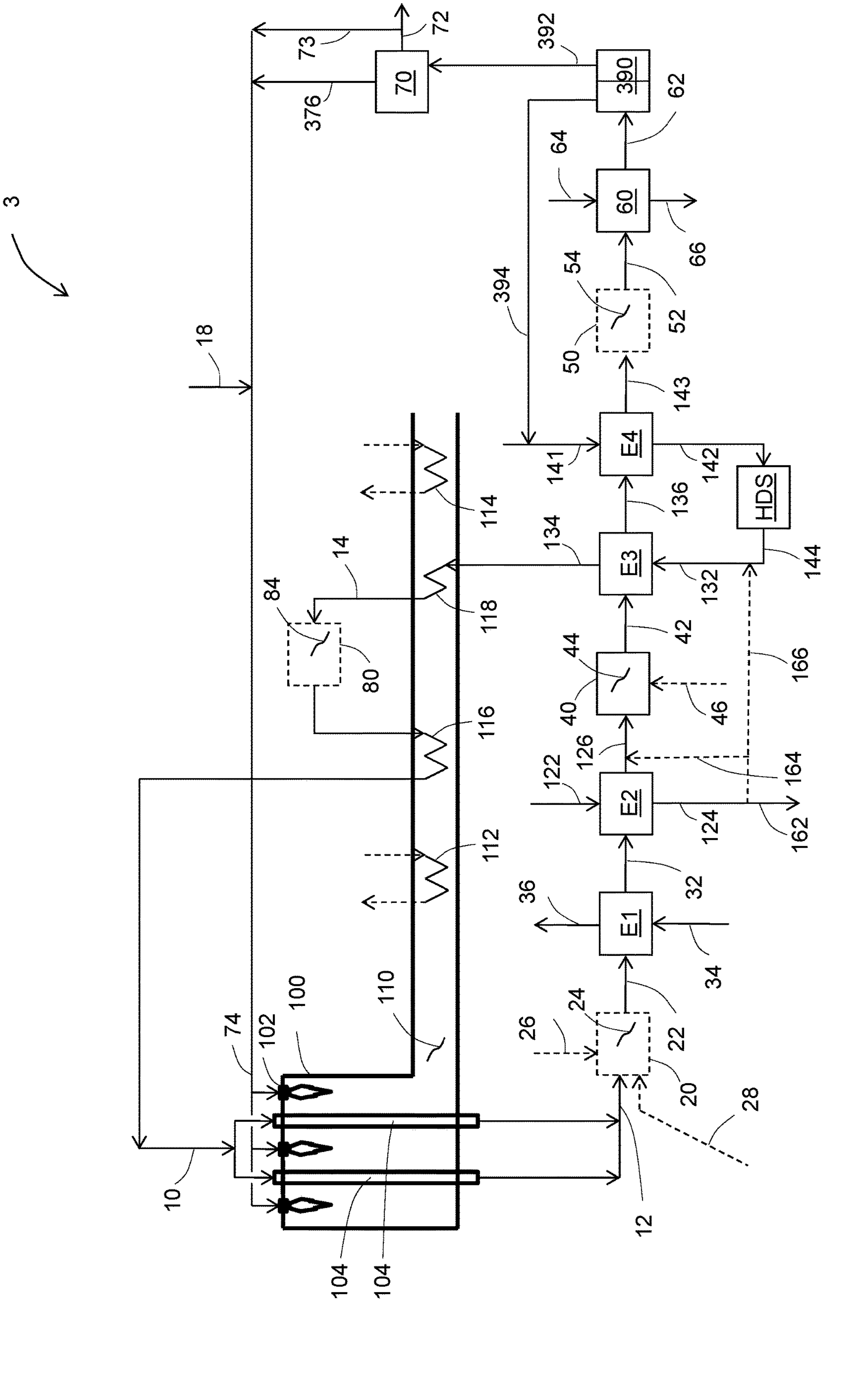
FIG. 3 is a diagram depicting a modification of FIG. 1 in which a membrane separates hydrogen from the syngas stream upstream of a product purification unit.

The flowsheet shown in FIG. 3 shows an embodiment of a reforming process 3 according to an additional example embodiment of the present disclosure in which the membrane is moved upstream of the product purification unit 70. The carbon dioxide-depleted syngas stream 62 is fed to an inlet port of a membrane separation system 390 which may comprise a single membrane stage or a plurality of membrane stages in series and/or parallel. The carbon dioxide-depleted syngas stream 62 is separated by selective permeation into a hydrogen-enriched permeate stream 392 which exits via a permeate outlet port and a hydrogen-depleted retentate stream 394 which exits via a retentate outlet port. Hydrogen selectively permeates the membrane over slower species such as methane and carbon monoxide. Owing to the small size of the hydrogen molecule, it has a high diffusivity and therefore is expected to permeate faster than methane and carbon monoxide for most membrane materials. As in FIG. 1, pretreatment may be performed on the carbon dioxide-depleted syngas stream 62 if required to protect the membrane materials, for example removal of trace amine vapors.

The hydrogen-enriched permeate stream 392 enters the product purification unit 70 to produce a hydrogen-enriched hydrogen product 72 and a hydrogen-depleted tail gas stream 376. In at least some embodiments the membrane separation system 390 is designed to deliver the hydrogen-enriched permeate stream 392 at a pressure high enough to feed the product purification unit 70 without requiring compression, typically requiring more membrane modules and/or a lower degree of hydrogen enrichment in the membrane separation system. The hydrogen-depleted tail gas stream 376 has had the bulk of the methane and carbon monoxide removed in the upstream membrane separation system 390 and so can be directed to the one or more burners 102. At least a portion of the hydrogen depleted retentate stream 394 may be combined with the first feed stream 141 as shown in FIG. 3, or may be combined with any other feed stream such as the second feed stream 142 or the third feed stream 144 (not shown). At least a portion of the hydrogen depleted retentate stream 394 may be combined with the prereformer feed stream 14 or the syngas stream 12 upstream of the secondary reformer reactor 20 (not shown). The hydrogen-depleted retentate stream 394 may be compressed if needed (not shown).

Figure 4:
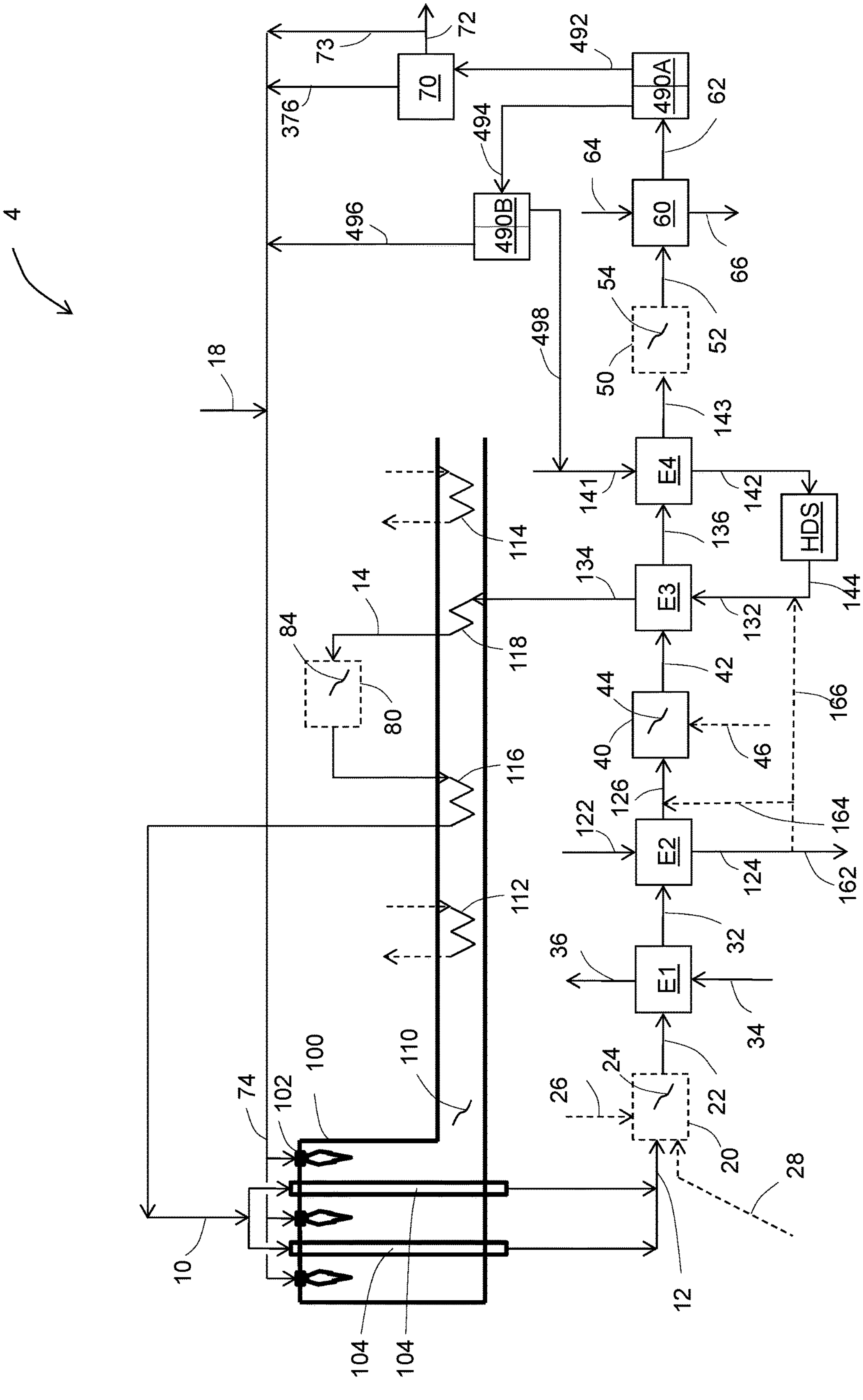
FIG. 4 is a diagram depicting a modification of FIG. 3 in which the membrane comprises two stages.

The flowsheet shown in FIG. 4 shows an embodiment of a reforming process 4 according to an additional example embodiment of the present disclosure in which the membrane separation system is a two-step process. The carbon dioxide-depleted syngas stream 62 is fed to an inlet port of a first membrane separation step 490A and separated by selective permeation into a first hydrogen-enriched permeate stream 492 which exits via a first permeate outlet port and a first hydrogen-depleted retentate stream 494 which exits via a first retentate outlet port. The hydrogen-enriched permeate stream 492 enters the product purification unit 70 as in FIG. 3, but the first hydrogen-depleted retentate stream 494 enters the inlet port of a second membrane separation step 490B. The first hydrogen-depleted retentate stream 494 may be compressed if needed (not shown). The first hydrogen-depleted retentate stream 494 is separated by selective permeation into a second hydrogen-enriched permeate stream 496 which exits via a second permeate outlet port and a second hydrogen-depleted retentate stream 498 which exits via a second retentate outlet port. The second hydrogen-enriched permeate stream 496 may be directed to the one or more burners 102 and the second hydrogen-depleted retentate stream 498 may be combined with the first feed stream 141, or may be combined with any other feed stream such as the second feed stream 142 or the third feed stream 144 (not shown). The second hydrogen-depleted retentate stream 498 may be compressed if needed (not shown).

Figure 5:
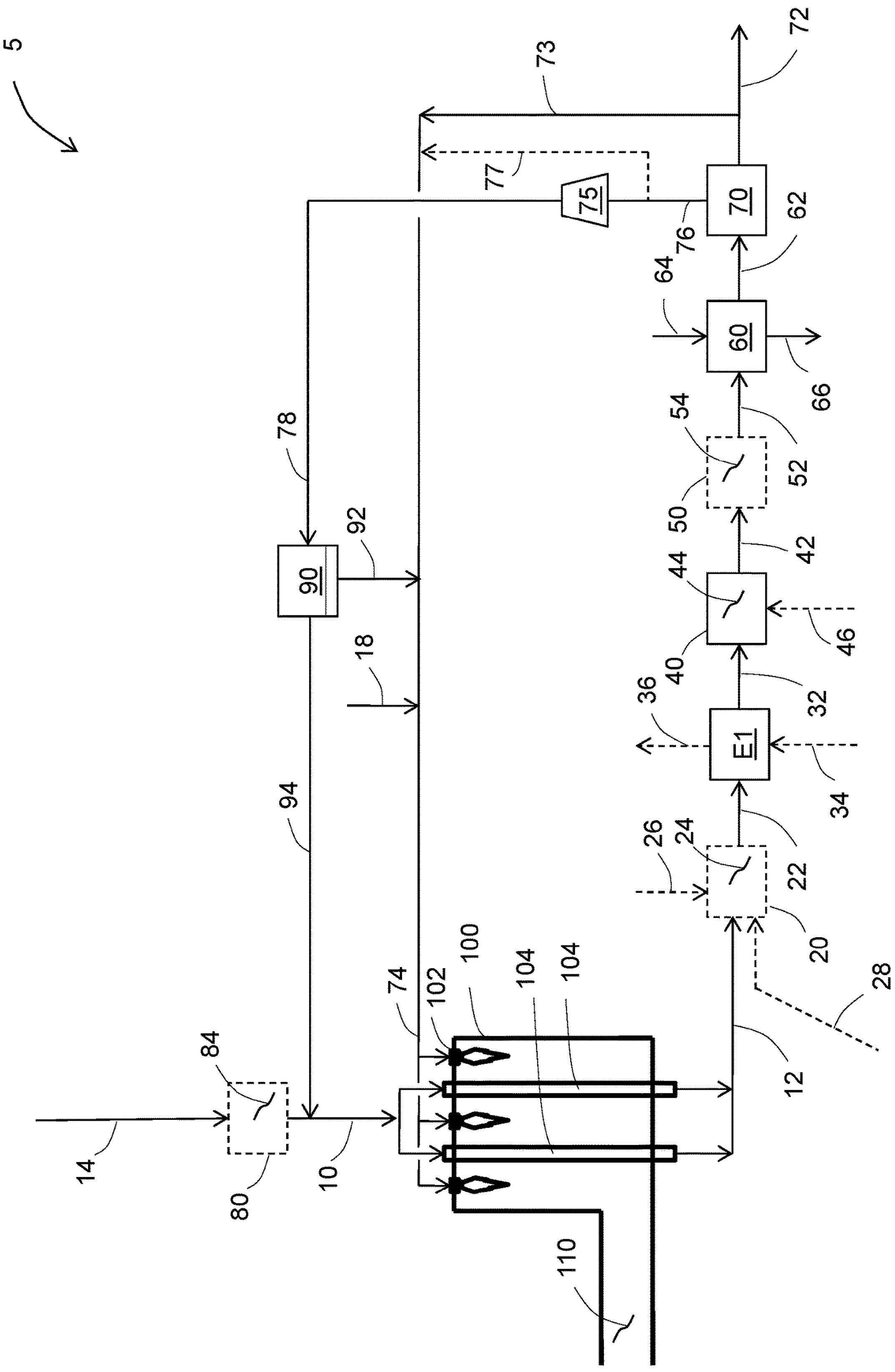
FIG. 5 (PRIOR ART)
FIG. 5 is a diagram depicting a prior art process for producing hydrogen with carbon capture.

The flowsheet diagram shown in FIG. 5 shows an embodiment of a prior art reforming process 5 in which the third syngas stream 32 exits the first heat exchanger system E1 and enters the high temperature shift reactor 40 without recovering additional heat.

While the principles of the disclosure have been described above in connection with preferred embodiments, it is to be clearly understood that this description is made only by way of example and not as a limitation of the scope of the disclosure. It will be appreciated by those skilled in the art that various modifications and alternatives to the specific embodiments described in detail could be developed in light of the overall teaching of the disclosure. Therefore, any of the features and/or elements which are described herein may be combined with one another in any combination and still be within the breadth of this disclosure.

EXAMPLE

The embodiment of reforming process 1 in FIG. 1 with zero steam export was analyzed using the commerically available Aspen™ process modeling software and compared to the prior art process of FIG. 5 that produces steam for export. For both processes 95% of the carbon dioxide produced in the overall process is captured. Table 1 compares the performance of the utility consumption and performance parameters of the reforming process 1 with and without a membrane. Export steam is sent to the battery limit at 750° F. and 625 psia. Derate is defined as the reduction of hydrogen production normalized to the same natural gas input compared to a process without carbon dioxide capture. The reduction of hydrogen production is effectively equal to the amount of hydrogen product that must be combusted in the burners as hydrogen product fuel fraction 73.

As can be seen in Table 1, the lower derate for reforming process 1 compared to the prior art process shows that the overall efficiency of the process improves when the steam export is eliminated. The lower derate indicates less of the product hydrogen must be used in the furnace. Less of the off-gas from the PSA is combusted in the burners 102 in the FIG. 1 case compared to the prior art. The temperature of the air entering the burners 102 is much higher than the prior art case due to improved heat integration which reduces the fuel requirement to heat the reformer tubes. In effect the heat that would otherwise be used to produce export steam is be used to improve the net efficiency of the process.

TABLE 1

| | FIG. 1 | FIG. 5 |
|---|---|---|
| Steam export/NG feed (mass fraction) | 0 | 0.50 |
| Fraction of PSA off-gas to fuel | 8% | 12% |
| Air Preheat T (C.) | 491 | 344 |
| Derate | 25% | 27% |
| Net Efficiency (MJ energy/kg H2 product) | 160 | 166 |

The invention claimed is:

1. A process for producing a syngas stream, the process comprising:

reacting a reformer feed stream comprising a hydrocarbon feedstock and a reactant selected from the group consisting of water and carbon dioxide in the presence of a reforming catalyst to produce a first syngas stream comprising hydrogen, carbon monoxide, and carbon dioxide;

transferring heat from the first syngas stream or a stream derived from the first syngas stream to a water stream to produce a second syngas stream and a first saturated steam stream;

transferring heat from the second syngas stream to a second saturated steam stream to produce a superheated steam stream and a third syngas stream;

reacting the third syngas stream in the presence of a first shift catalyst to produce a first shifted syngas stream;

wherein the second saturated steam stream comprises at least a portion of the first saturated steam stream;

wherein the temperature of the third syngas stream ranges from 750° F. to 1050° F.

2. The process of claim 1, wherein the reformer feed stream comprises at least a portion of the superheated steam stream.

3. The process of claim 1, further comprising transferring heat from the first shifted syngas stream or a stream derived from the first shifted syngas stream to a first mixed feed stream to produce a second mixed feed stream and a second shifted syngas stream;

wherein the hydrocarbon feedstock comprises at least a portion of the second mixed feed stream.

4. The process of claim 1, further comprising combining at least a portion of the superheated steam stream with the third syngas stream.

5. The process of claim 1, further comprising dividing a portion of the second syngas stream to form a steam superheater bypass fraction; and combining at least a portion of the steam superheater bypass fraction with the third syngas stream.

6. The process of claim 5, wherein the temperature of the third syngas stream is controlled by changing the flow rate of the steam superheater bypass fraction.

7. The process of claim 1, wherein the reaction of the reformer feed stream takes place within a plurality of catalyst-containing reformer tubes.

8. The process of claim 1, further comprising combining an oxygen-rich gas with the first syngas stream to partially oxidize and react the first syngas stream.

9. The process of claim 1, further comprising reacting a prereformer feed stream comprising methane and a reactant selected from the group consisting of water and carbon dioxide in the presence of a prereforming catalyst to produce the reformer feed stream.

* * * * *